United States Patent
Meisiek et al.

(10) Patent No.: US 10,088,069 B2
(45) Date of Patent: Oct. 2, 2018

(54) ELECTROMAGNETICALLY ACTUATED VALVE

(71) Applicant: Robert Bosch GmbH, Stuttgart (DE)

(72) Inventors: Achim Meisiek, Rudersberg (DE); Stefan Kolb, Gaertringen (DE)

(73) Assignee: Robert Bosch GmbH, Stuttgart (DE)

( * ) Notice: Subject to any disclaimer, the term of this patent is extended or adjusted under 35 U.S.C. 154(b) by 72 days.

(21) Appl. No.: 15/102,040

(22) PCT Filed: Oct. 21, 2014

(86) PCT No.: PCT/EP2014/072522
§ 371 (c)(1),
(2) Date: Jun. 6, 2016

(87) PCT Pub. No.: WO2015/082118
PCT Pub. Date: Jun. 11, 2015

(65) Prior Publication Data
US 2016/0305570 A1    Oct. 20, 2016

(30) Foreign Application Priority Data

Dec. 6, 2013  (DE) ........................ 10 2013 225 162

(51) Int. Cl.
*F16K 31/06*   (2006.01)
*F02M 63/00*   (2006.01)
*F02M 59/36*   (2006.01)

(52) U.S. Cl.
CPC ....... *F16K 31/0655* (2013.01); *F02M 59/368* (2013.01); *F02M 63/0019* (2013.01);
(Continued)

(58) Field of Classification Search
CPC .............. F16K 31/0655; F02M 59/368; F02M 63/0022; F02M 63/0035; F02M 2200/02;
(Continued)

(56) References Cited

U.S. PATENT DOCUMENTS 5,669,364 A * 9/1997 Everingham .... F02M 35/10222
123/568.18
5,947,442 A * 9/1999 Shurman ............ F02M 63/0017
251/129.16

(Continued)

FOREIGN PATENT DOCUMENTS

CN        101903642 B    3/2013
DE        10251014 A1    5/2004
(Continued)

OTHER PUBLICATIONS

International Search Report for Application No. PCT/EP2014/072522 dated Mar. 2, 2015 (English Translation, 2 pages).

*Primary Examiner* — Seth W Mackay-Smith
(74) *Attorney, Agent, or Firm* — Michael Best & Friedrich LLP

(57) ABSTRACT

An electromagnetically actuated valve comprising a valve piston including a first end and an opposite second end, a valve plate at the first end of the valve piston, a spring plate which is fastened to the second end of the valve piston and which has a first planar contact surface, a valve spring that lies against the spring plate and that moves the valve plate into a closed position, and an electromagnet including a coil, an armature pin which has a second planar contact surface that is parallel relative to and that bears against the first planar contact surface, and an armature arranged on the armature pin, wherein the first planar contact surface and the second planar contact surface each have a diameter that is greater than a greatest diameter of the armature pin and a diameter of the second end of the valve piston.

14 Claims, 1 Drawing Sheet

(52) U.S. Cl.
CPC .... *F02M 63/0022* (2013.01); *F02M 63/0035* (2013.01); *F02M 2200/02* (2013.01); *F02M 2200/03* (2013.01); *F02M 2200/08* (2013.01)

(58) Field of Classification Search
CPC .. F02M 2200/03; F02M 2200/08; F04B 53/10
See application file for complete search history.

(56) References Cited

U.S. PATENT DOCUMENTS

| | | | | |
|---|---|---|---|---|
| 5,960,776 | A * | 10/1999 | Everingham | F16K 31/0655 123/568.26 |
| 6,439,214 | B1 * | 8/2002 | Yew | F02M 63/0022 123/568.21 |
| 6,789,532 | B2 * | 9/2004 | Kato | F02M 26/22 123/568.12 |
| 2005/0230494 | A1 * | 10/2005 | Lucas | F02M 47/027 239/88 |
| 2010/0282991 | A1 * | 11/2010 | Okamoto | F16K 31/0655 251/129.15 |
| 2011/0265765 | A1 * | 11/2011 | Furuhashi | F02D 41/08 123/446 |
| 2011/0315907 | A1 * | 12/2011 | Ams | F16K 31/0655 251/129.15 |

FOREIGN PATENT DOCUMENTS

| | | |
|---|---|---|
| DE | 102009047649 A1 | 6/2011 |
| DE | 102010027745 | 10/2011 |
| DE | 102011088108 | 6/2013 |
| EP | 1561026 B1 | 4/2013 |
| JP | 09112731 | 5/1997 |

* cited by examiner

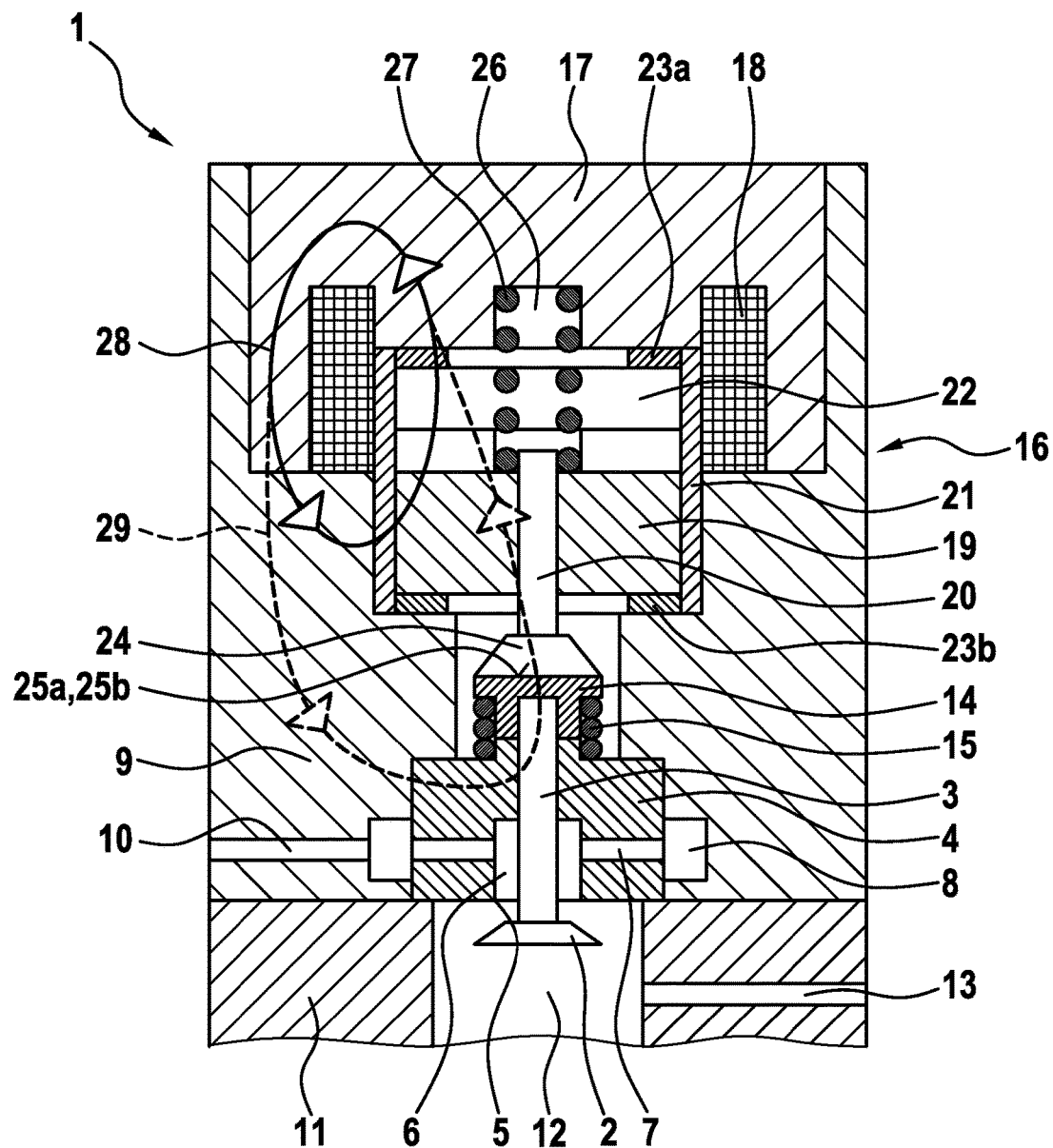

ELECTROMAGNETICALLY ACTUATED VALVE

BACKGROUND OF THE INVENTION

The invention relates to an electromagnetically actuated valve, comprising a valve piston bearing a valve plate. A spring plate is fastened to the valve piston, against which spring plate a valve spring that moves the valve into a closed position lies. The valve also comprises an electromagnet, which has a coil and an armature that is arranged on an armature pin. The armature pin interacts with the valve piston by means of a contact point.

Such an electromagnetically actuated valve is known from the German patent application DE 10 2011 088 108 A1. This electromagnetically actuated valve is designed as an inlet valve for a high-pressure pump of a fuel injection system. The electromagnetically actuated valve determines the quantity of fuel to be delivered to a high-pressure pump working chamber. The electromagnetically actuated valve comprises an electromagnet, which has an armature that is arranged on an armature pin. The armature pin interacts with a valve piston of the valve by means of a contact point. The valve piston has a circumferential annular groove adjacent to the contact point, in which groove a valve plate is inserted that extends circumferentially beyond the groove. A valve spring is supported on the valve plate, said valve spring moving the valve into a closed position in the resting state.

SUMMARY OF THE INVENTION

The aim underlying the invention is to provide an electromagnetically actuated valve, the function of which is improved while a low level of structural complexity is attained.

This aim is met in that the contact point has a diameter that is enlarged in relation to the diameter of the armature pin and of the valve piston and is planar. By this enlargement of the contact point, the contact pressure of the valve piston and of the armature pin acting on the contact point is reduced, whereby the components interacting with one another are prevented from working into one another.

The creation or respectively introduction of a magnetic stray flux in/into the contact point is particularly promoted by the enlargement of the contact position, wherein the magnetic stray flux brings about a frictional adherence of the components, i.e. the valve piston and the armature pin, to each other at the contact point. As a result, a closing movement of the valve can be significantly improved, in particular carried out faster. It can be assumed in this case that the electromagnet, in a deenergized state thereof, is pressed with the armature pin against the valve piston by a compression spring and that the spring force of the compression spring is greater than that of the valve spring, so that the valve is open in the resting state. In this resting state, a flow connection controlled by the valve is open and a fluid flow flows through the valve. Only if current is passed through the electromagnet is the armature pin moved against the force of the compression spring and, in a conventional configuration, is moved away from the valve piston. In this operating state, the weak valve spring can accordingly move the valve into the closed position, wherein the flow connection controlled by the valve is closed. By virtue of the fact that the armature pin and the valve piston now adhere to each other when the coil is energized by means of the stray flux or respectively the generated magnetism, the closing movement of the valve is carried out considerably faster. As a result, the function of the system is improved while a low level of structural complexity is attained. In particular, the fluid quantity controlled by the valve can thus be more precisely set. In conclusion, the following significant advantages result:

the switching time of the valve is reduced and
a wear-resistant contact point is formed.

In one embodiment of the invention, the spring plate is arranged at the end of the valve piston and forms a first contact surface of the contact point. In so doing, the spring plate can, for example, be pressed onto the valve piston while forming a first planar and end face contact surface or be fastened by means of retaining wedges that grip into a recess of the spring plate and interact with the valve piston. This configuration achieves an enlargement of the first contact surface of the contact point formed on the valve without additional components.

In another embodiment of the invention, a second contact surface of the contact point is formed from an armature pin base arranged terminally on the armature pin. This armature pin base can be formed integrally with armature pin by designing said armature pin in a suitable manner. In another configuration, the armature pin base is however designed as a separate component and pressed onto the armature pin. This configuration can be simply and cost effectively produced.

In a further embodiment of the invention, the material of the spring plate and the armature pin base advantageously has ferromagnetic properties to a particular extent. The armature pin and the valve piston are already conventionally manufactured from a ferromagnetic iron material, so that in total components having at least very similar properties are used. For example, the armature pin base and the spring plate can be manufactured from a very wear-resistant and at the same time ferromagnetic iron material, whereby possible wear to the contact point is further reduced. In so doing, additional costs due to higher quality materials are negligible.

In a further embodiment of the invention, a stray magnetic flux produced by the electromagnet is introduced in a targeted manner into the contact point. This introduction of the stray magnetic flux is achieved by means of the configuration of the electromagnet, of the valve and of the housing parts.

In a further embodiment of the invention, the armature is magnetically separated from the encasing components radially via a bushing and axially via residual air split discs. As a result, a magnetic clamping is prevented and a trouble-free movement of the armature is achieved. In addition, this insulation can also be used in a targeted manner for the introduction of the magnetic stray flux into the contact point comprising the contact surfaces.

In another embodiment of the invention, the electromagnetically actuated valve is a part of a high-pressure fuel pump for mounting on an internal combustion engine. The electromagnetically actuated valve can basically be used in any system, wherein the advantages set out above come into effect especially when used on a high-pressure fuel pump. In the case of the electromagnetically actuated valve, the quantity of fuel to be delivered to the pump working chamber of the high-pressure fuel pump is defined. By improving the switching behavior, the precision in metering the quantity of the fuel through the valve can be further increased. By reducing the contact pressure of the contact surfaces interacting with one another, the service life of the high-pressure fuel pump is itself improved.

BRIEF DESCRIPTION OF THE DRAWINGS

Further advantageous embodiments of the invention can be extracted from the description of the drawings, in which one exemplary embodiment depicted in the figures is described in detail.

FIG. 1, the only drawing figure, shows a longitudinal cross section of an electromagnetically actuated valve which is installed on a high-pressure fuel pump of a fuel injection system.

DETAILED DESCRIPTION

The electromagnetically actuated valve 1 depicted in FIG. 1 comprises an effective valve 1 comprising a valve piston 3 bearing a valve plate 2, wherein the valve piston 3 is guided in a valve cylinder 4 while simultaneously forming a valve seat 5 for the valve plate 2. A valve chamber 6 is adjacent to the valve seat 5, said valve chamber being connected via bores 7 to a surrounding annular chamber 8 in a valve housing 9. The annular chamber 8 is in turn connected via an access bore 10 to the further fuel system. The valve housing 9 is, for example, installed in a pump cylinder head 11 of a high-pressure fuel pump. A pump working chamber 12 of the high-pressure fuel pump is embedded in the pump cylinder head 11. The pump working chamber 12 is filled with fuel in the depicted open position of the valve plate 2 via the access bore 10, the annular chamber 8, the bores 7 and the valve chamber 6.

This filling of the pump working chamber 12 occurs during a downward movement of a pump piston that can be moved below said pump working chamber 12 in a cylinder bore of a pump cylinder connected to the pump cylinder head. This pump piston is intermittently moved up and down by a cam shaft or an eccentric shaft of the high-pressure fuel pump, wherein the pump piston, during an upward movement of said pump piston and thus the valve plate 2 of the valve piston 3, said valve plate sealing off the pump working chamber 12 from the valve chamber 6, conveys the fuel situated in the pump working chamber 12 via a high-pressure outlet 13 that comprises an inserted check valve into an ongoing high-pressure line that is connected to a high-pressure accumulator of the fuel injection system. The fuel, which is stored at a pressure of 3,000 bar in the high-pressure accumulator, can be extracted by fuel injectors from said accumulator in order to be injected into associated combustion chambers of the internal combustion engine. The fuel from a low-pressure fuel system, which is a constituent part of the fuel injection system and is, for example a tank, is supplied to the access bore 10.

Opposite to the valve plate 2, a spring plate 14 is fastened to the valve piston 3. A valve spring 15 is tensioned between the spring plate 14 and the valve housing 9. The valve spring 15 has a low spring stiffness and presses (irrespective of other operating forces) the valve plate 2 into abutment against the valve seat 5. An electromagnet 16 as a part of the electromagnetically actuated valve 1 is disposed above the valve piston 3, said electromagnet having a coil 18 disposed in a magnet housing 17. The magnet housing 17 is inserted into a cylinder recess in the valve housing 9. Furthermore, the electromagnet 16 has an armature pin 20 that bears an armature 19 and is guided in a guide arranged with the valve housing 9 or the magnet housing 17 so as to be moveable in the longitudinal direction. The armature pin 20 can, however, also be installed without its own guide, and the armature 19 can be guided in the valve housing 9 and/or the magnet housing by means of a bushing 21 that surrounds the armature 19 and consists of a magnetically insulating material. In addition, axial residual air split discs 23a, 23b are installed in an armature space 22 that accommodates the armature 19. The axial residual air split discs 23a, 23b are likewise manufactured from a magnetically insulating material and limit the axial movements of the armature 19 and consequently also the axial movements of the armature pin 20.

An armature pin base 24 is fastened to, for example pressed onto, the armature pin 20, wherein the armature pin base 24 is disposed opposite to the spring plate 14 and has an outside diameter that is significantly enlarged in relation to the diameter of the valve piston 3 and the armature pin 20. The armature pin base has ideally the same outside diameter as the spring plate 14. The spring plate 14 and the armature pin base 24 have a first contact surface 25a and a second contact surface 25b, which together form a contact point between the valve piston 3 and the armature pin 20. The contact point or that is to say the contact surfaces 25a, 25b are designed planar in relation to one another and particularly transmit the opening movement exerted by the electromagnet 16 via the armature pin 20 onto the valve piston 3. A compression spring 27 having a high spring stiffness is disposed in the armature space 22 and a compression spring space 26 arranged above it. In the deenergized state of the coil 18, the compression spring 27 presses the armature pin 20 and the armature pin base 24 onto the spring plate 14 and thus while overcoming the spring force of the valve spring 15 presses the valve piston 3 in the direction of the pump working chamber 12 in order to set the open position of the valve plate 2.

When current is passed through the coil 18, an electromagnetic field 28 is generated circumferentially around the coil 18, said electromagnetic field moving the armature together with the armature pin 20 upward until abutment on the upper residual air split disc 23a. As a result, the valve spring 15 can move the spring plate 14 and thus the valve piston 3 and the valve plate 2 upwards until the valve plate 2 abuts on the valve seat 5. This movement is supported by a magnetic stray field 29 which acts on the armature pin base 24, the armature pin 20 as well as on the spring plate 14 and the valve piston 3 and causes said components to adhere to one another in a force-fitting manner. The high switching speed of the electromagnet 16 is therefore also used in order to close the valve 1 more quickly. Force is conventionally applied to said valve 1 in the closing direction only by the valve spring 15. In addition to the faster closing movement of the valve 1, the contact pressure in the contact surfaces 25a, 25b is reduced due to the contact surfaces 25a, 25b which enable contact over a large area.

What is claimed is:

1. An electromagnetically actuated valve (1) comprising:
 a valve piston (3) including a first end and an opposite second end;
 a valve plate (2) at the first end of the valve piston (3);
 a spring plate (14) which is fastened to the second end of the valve piston (3) and which has a first planar contact surface (25a);
 a valve spring (15) that lies against the spring plate (14) and that moves the valve plate (2) into a closed position; and
 an electromagnet (16) including a coil (18), an armature pin (20) which has a second planar contact surface (25b) that is parallel relative to and that bears against the first planar contact surface (25a), and an armature (19) arranged on the armature pin (20);

wherein the first planar contact surface (25a) and the second planar contact surface (25b) each have a diameter that is greater than a greatest diameter of the armature pin (20) and a diameter of the second end of the valve piston (3), and wherein the first planar contact surface and the second planar contact surface are solid circular surfaces and constantly planar along any diameter of the first planar contact surface and the second planar contact surface.

2. The electromagnetically actuated valve (1) according to claim 1, wherein the first contact surface (25a) and the second contact surface (25b) are substantially the same size.

3. The electromagnetically actuated valve (1) according to claim 1, wherein the first planar contact surface (25a) and the second planar contact surface (25b) each have a diameter that is greater than a greatest diameter of the armature pin (20) and a greatest diameter of the valve piston (3).

4. The electromagnetically actuated valve (1) according to claim 1, characterized in that the second contact surface (25b) is formed by an armature pin base (24) arranged terminally on the armature pin (20).

5. The electromagnetically actuated valve (1) according to claim 4, characterized in that the armature pin base (24) is pressed onto the armature pin (20).

6. The electromagnetically actuated valve (1) according to claim 5, characterized in that the material of the spring plate (14) and the armature pin base (24) is ferromagnetic.

7. The electromagnetically actuated valve (1) according to claim 6, characterized in that a magnetic stray field (29) generated by the electromagnet (16) is introduced into the first and second contact surfaces (25a,25b).

8. The electromagnetically actuated valve (1) according to claim 7, characterized in that the armature (19) is magnetically separated from encasing components radially via a bushing (21) and axially via residual air split discs (23a, 23b).

9. The electromagnetically actuated valve (1) according to claim 8, characterized in that the armature pin (20), to which force is applied by a compression spring (27), presses the valve (1) into an open position in a deenergized state of the electromagnet (16).

10. The electromagnetically actuated valve (1) according to claim 4, characterized in that the material of the spring plate (14) and the armature pin base (24) is ferromagnetic.

11. The electromagnetically actuated valve (1) according to claim 1, characterized in that a magnetic stray field (29) generated by the electromagnet (16) is introduced into the first and second contact surfaces (25a,25b).

12. The electromagnetically actuated valve (1) according to claim 1, characterized in that the armature (19) is magnetically separated from encasing components radially via a bushing (21) and axially via residual air split discs (23a, 23b).

13. The electromagnetically actuated valve (1) according to claim 1, characterized in that the armature pin (20), to which force is applied by a compression spring (27), presses the valve plate (2) into an open position in a deenergized state of the electromagnet (16).

14. The electromagnetically actuated valve (1) according to claim 1, characterized in that the electromagnetically actuated valve (1) is an inlet valve of a high-pressure fuel pump for an internal combustion engine.

* * * * *